United States Patent
Schounard

(10) Patent No.: US 7,040,436 B1
(45) Date of Patent: May 9, 2006

(54) SNOWMOBILE SLIDE

(75) Inventor: Philip N. Schounard, Green Bay, WI (US)

(73) Assignee: Versatile Plastics, Inc., Green Bay, WI (US)

( * ) Notice: Subject to any disclaimer, the term of this patent is extended or adjusted under 35 U.S.C. 154(b) by 0 days.

(21) Appl. No.: 10/420,155

(22) Filed: Apr. 22, 2003

(51) Int. Cl.
*B62M 27/00* (2006.01)

(52) U.S. Cl. .................. 180/182; 305/127; 52/630

(58) Field of Classification Search ............. 305/127, 305/120, 181, 168; 414/483; 104/137; 105/355, 105/422, 423; 180/182; 296/26.08, 39.2; 52/630
See application file for complete search history.

(56) References Cited

U.S. PATENT DOCUMENTS

| | | | |
|---|---|---|---|
| 3,964,561 A | | 6/1976 | Lunzer et al. |
| 4,222,698 A | * | 9/1980 | Boelter ................. 414/477 |
| 4,358,916 A | * | 11/1982 | Lacasse ................. 52/630 |
| 4,675,238 A | * | 6/1987 | Karoubas ............... 428/599 |
| 4,726,159 A | * | 2/1988 | Stohs ..................... 52/99 |
| 4,962,622 A | * | 10/1990 | Albrecht et al. .......... 52/630 |
| 5,546,870 A | | 8/1996 | Meacham et al. |
| 5,599,030 A | * | 2/1997 | Campbell et al. ......... 280/28 |
| 5,609,110 A | * | 3/1997 | Meacham et al. ......... 105/355 |
| 5,688,099 A | * | 11/1997 | Fischer ................. 414/537 |
| 5,794,291 A | * | 8/1998 | Olaussen et al. ........ 14/69.5 |
| 5,829,545 A | * | 11/1998 | Yamamoto et al. ....... 180/190 |
| 5,836,594 A | | 11/1998 | Simmons |
| 6,086,082 A | | 7/2000 | Andol |
| 6,099,218 A | | 8/2000 | Ferrari |
| 6,155,656 A | * | 12/2000 | Gulla .................... 305/127 |
| 6,276,699 B1 | | 8/2001 | Simmons et al. |
| 6,513,612 B1 | | 2/2003 | Moriyama et al. |
| 6,595,142 B1 | * | 7/2003 | Christensen ............ 105/375 |

OTHER PUBLICATIONS

Instantop, Inc. Trailer Accessories, http://www.instantop.com/Matrix.htm, Oct. 15, 2003, 5 pgs.
Floe, Optional Features/Accessories for Floe Trailers, http://www.floeintl.com/snowmobile_trailers/optional_trailer_features.html, Oct. 15, 2003, 2 pgs.
The Snowmobile Store (Buck's Sports Products): Browsing Trailer Ski Guide System, http://www.thesnowmobilestore.com/ach/showprod.cfm?&DID=32&ObjectGroup_ID=1, Oct. 15, 2003, 11 pgs.
Koronis Parts Inc., http://sno-stuff.com/KPI/KPI.htm, Oct. 15, 2003, 13 pgs.

(Continued)

*Primary Examiner*—Frantz F. Jules
(74) *Attorney, Agent, or Firm*—Reinhart Boerner Van Deuren s.c.

(57) ABSTRACT

A snowmobile slide includes a slide member having specific guide members therein for guiding, supporting, and contacting single runner and multiple runner snowmobile skis. The guide members including pairs of raised vertical ribs and a groove. The vertical ribs defining pairs of upwardly facing surfaces with the groove therebetween. The guide member is dimensioned to engage, support, and guide runners of the snowmobile skis without a portion of the snowmobile ski resting on the upwardly facing surfaces of the vertical ribs. Snowmobile slide kits are also included.

20 Claims, 3 Drawing Sheets

OTHER PUBLICATIONS

Ideal Plastic LTC, Patios, Decks, & Fencing—Edmonlonplus.ca, http://www.edmontonplus.ca/infosite/16555/3.html, Oct. 20, 2003, 2 pgs.

Garage—Toys, http://shop.store.yahoo.com/streamlinedistribution/raandtreq1.html, Oct. 20, 2003, 5 pgs.

Why Sledders Choice. http://www.sledderschoice.com/about.html, Apr. 15, 2003, 9 pgs.

Powermadd Extreme Motorsports, http://www.powermadd.com/products.cfm, Mar. 14, 2003, 6 pgs.

E-Z Off Trailer Guides for Snowmobile and Boat Trailers, http://www.slideguides.com/, Mar. 14, 2003, 4 pgs.

USI Ultimate Sports Inc., http://www.usi-skis.com/ct_CH13934119.htm, Mar. 18, 2003, pp. 1-4.

* cited by examiner

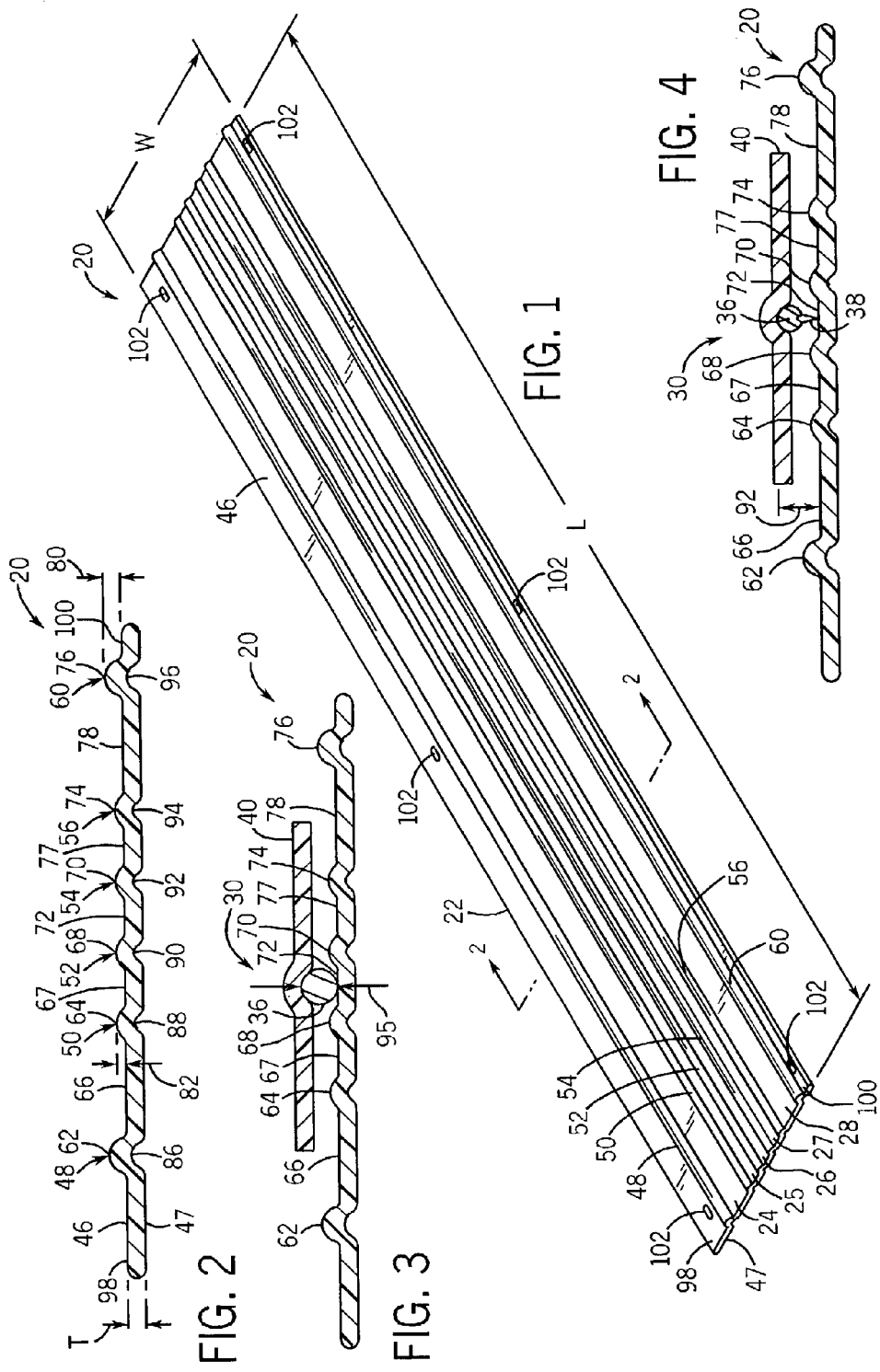

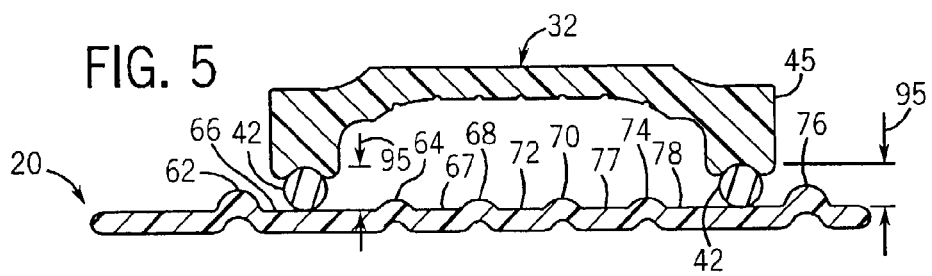
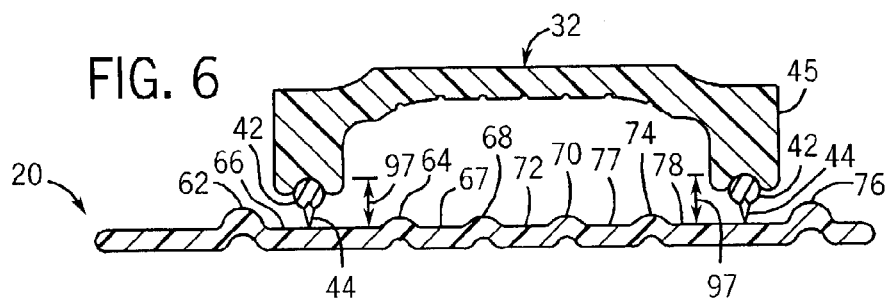
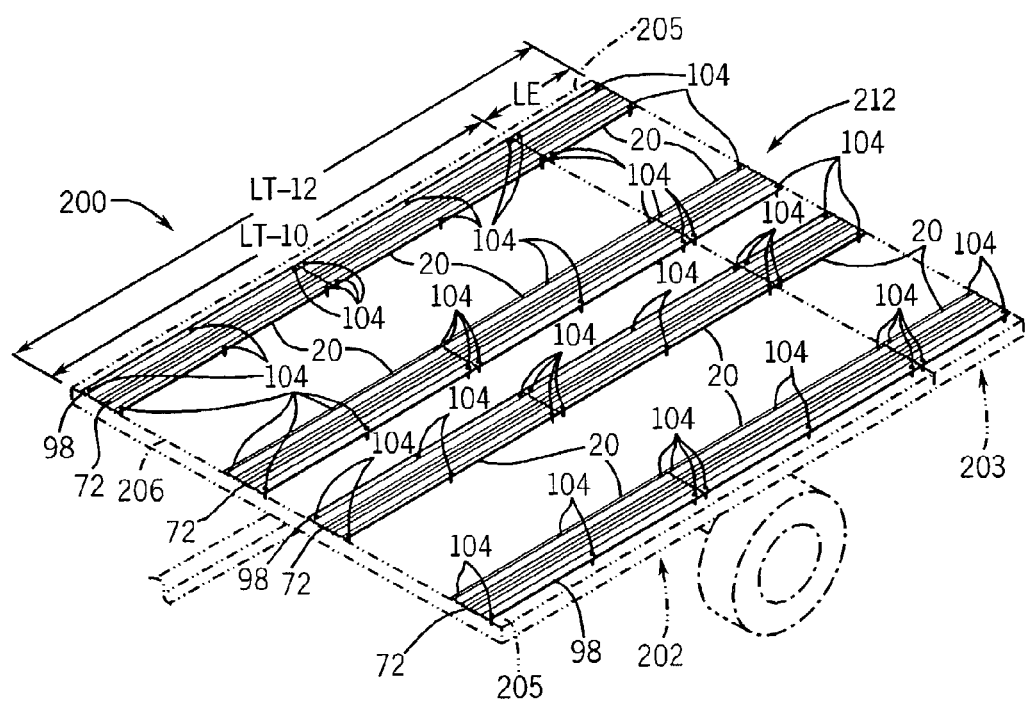
FIG. 7

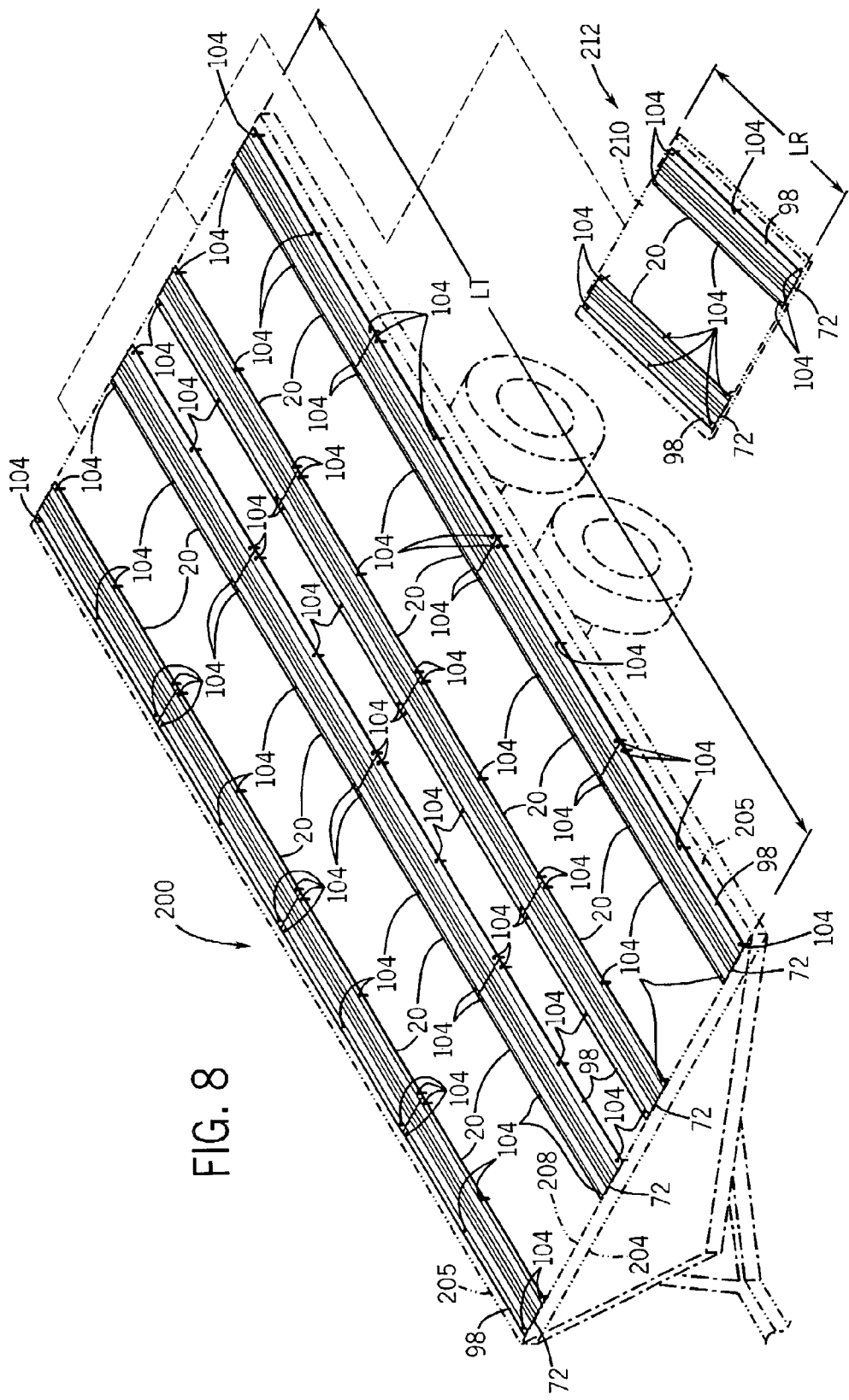

SNOWMOBILE SLIDE

BACKGROUND OF THE INVENTION

Field of the Invention

The present invention relates generally to snowmobile slides and more specifically to a snowmobile slide which accommodates single and multiple runner snowmobile skis.

Snowmobiling is such an enjoyable winter sport that the snowmobiler may own more than one snowmobile, transporting the snowmobile(s) on a trailer to and from various snowy sites. Typically, the snowmobile trailer has a flat deck made of wooden material onto which the snowmobile is loaded. (See, U.S. Pat. No. 6,086,082 to Andol.) The snowmobile is on or off loaded onto the deck many times during the snowmobiling season. Some trailers have ramps integrated into the trailer. Thus, ease of loading and off-loading becomes a consideration for the snowmobile enthusiast.

As is known, a snowmobile has a pair of skis used for steering. Each snowmobile ski has one or more runners which provide traction and contact the snow, ice, gravel or dirt surfaces upon which the snowmobile is operated. Each snowmobile runner has a wear rod (or guide rod or host bar) made of metal. (See U.S. Pat. No. 5,836,594 to Simmons and U.S. Pat. Nos. 5,546,870 and 5,609,110 both to Meacham et al.) Some snowmobile skis have just a wear rod as the runner. Other snowmobiles have an additional wear resistant element in the wear rod of the snowmobile's skis to form the runner. The wear resistant element (or insert) protrudes or extends from the wear bar. (See, U.S. Pat. No. 3,964,561 to Lunzer et al., U.S. Pat. No. 6,513,612 B2 to Moriyama et al., U.S. Pat. No. 5,599,030 to Campbell et al.) The wear resistant elements, frequently made of a metal carbide material or similar hardened material, have sharp edges and ends which are in contact with the snow, ice, gravel or dirt surfaces. Frequently the runners are called "carbides" because of the metal component used, e.g., "carbide".

Both types of snowmobile ski's, those without or with wear resistant elements unfortunately gouge the wooden trailer deck, typically plywood, (and wooden ramp, if present) when the snowmobile(s) are on or off-loaded. The gouging is caused by the friction and drag of sliding the metal carbide wear resistant insert or metal wear rod against the wood of the deck (and ramp); thereby shortening the useful life of the deck (and ramp). The friction between the runners and the wood also make the movement of the snowmobile onto or off the trailer deck or ramp very difficult.

U.S. Pat. No. 6,099,218 to Ferrari provides a snowmobile trailer with hold down assemblies and raised platforms on a flat deck to accommodate the snowmobile's track with the skis located on either side of the platform. Unfortunately there still may be deck surface damage due to the snowmobile's wear resistant elements contacting the deck during on and off loading of the snowmobile(s).

Others have tried to address the problems of guiding movements of runnered vehicles. U.S. Pat. Nos. 5,546,870 and 5,609,110 both to Meacham et al. provide a pair of spaced channel members affixed onto the flat deck of a snowmobile trailer for guiding, loading and off-loading a snowmobile from a trailer. The channel members have upwardly extending working surfaces which engage portions of the skis and recessed zones into which the wear rod and wear resistant element are suspended, being lifted above the baseplane of the channel member and not contacting the sidewalls of the interior of the channel. When the snowmobile ski is slid on the upwardly extending working surfaces, there are two sources of friction on the ski; e.g., one on each of the upwardly extending working surfaces, requiring more energy to load/off-load the snowmobile than a slide product where there is only one source of friction.

This inventor in the early 1990's, developed a plastic guiding system for creating a slippery barrier between the metal snowmobile ski's components and the wood, typically plywood, on the ramp and/or the deck. These "slides", as the inventor referred to them, allowed the single runner ski to run within one central groove that was molded within the slide material. A slide was installed on the trailer (and ramp, if present) under each ski position of path. Sometimes the slide was installed in sections. The snowmobile now moved effortlessly forward or back depending on the wishes of its owner. Tilt bed trailers (those that have to be tilted upward to permit the exit of the snowmobile) would typically have the inventor's slides on the deck. Tilt bed trailers normally carry a maximum of two snowmobiles. A drive-on/drive-off trailer could carry as many as four snowmobiles, e.g. two rows of two snowmobiles per row. The front and the rear snowmobiles would need to be of the same "ski stance" or same center measurement of the ski runners to be able to utilize the same path of slides. Around 1992, snowmobile manufacturers were making snowmobiles with varying ski stance measurements, so it was difficult for the same trailer outfitted with the inventor's slide or other's slides to utilize the same area because the ski stances varied, e.g., skis would not fit within the same path. To solve this problem, this inventor designed another plastic slide (see, QUADRA-SLIDE—sold by Versatile Plastics, Inc. d/b/a PJS Products and/or PJS Products, Inc., Green Bay, Wis. USA; www.sledderschoice.com) having four 2.5 cm (one inch) wide grooves, equally spaced, which permitted the use of single runner skis where the snowmobiles had 96.5 cm to 104 cm (thirty eight to forty one inch) ski stances. This still accommodated only the single runner skis.

Others have disclosed slides for commercial use. PowerMadd Extreme Motor Sports, http//www.powermadd.com/products.cfm, shows two types of slides. One type of slide is the MULTI-GLIDES AND MULTI-GLIDES WIDE trailer slide system which provides a deep-channel design which suspends all types of carbon wear rods for dual runner skis. The other type of slides is the LOWPRO GLIDES AND LOWPRO GLIDES WIDE, low profile trailer slide systems, which illustrate a plurality of ridge-like channels which suspend the carbide inserts. The low profile slides appear to be useful for only a single runner ski. These slides fail to address the problem of having single runner skis and dual runner skis fitting on the same set of ski slides.

Slide Guides, Inc., http//www/slideguides.com, advertises a WIDESLIDE trailer slide for all dual runner skis; the device is said to allow snowmobiles with different ski stances on one trailer. The device is said to have a 21 cm (eight inch by three-eighths inch) thick multi-groove slide. Again, this slide appears to accommodate only the dual runner ski's.

It is accordingly the primary objective of the present invention to provide a snowmobile ski slide to guide snowmobile machines having single runner skis or multiple runner skis on the same slide.

The apparatus of the present invention must also be of construction which is both durable and long lasting, and it should also require little or no maintenance to be provided by the user throughout its operating lifetime. In order to enhance the market appeal of the apparatus of the present invention, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present invention. With this invention, only a single snowmobile slide advantageously accommodates single runner and multiple runner snowmobile skis. Advantageously there is no need to have a separate slide or a separate trailer for the snowmobile having single runner skis and a separate snowmobile slide or a separate trailer for the snowmobile having multiple runner skis.

The snowmobile slide of the present invention has a slide member having specific guide members therein for guiding, supporting, and contacting single runner and multiple runner snowmobile skis. The single runner snowmobile ski is of a type having a single wear rod or of a type having a single wear rod with a wear resistant element. The single wear resistant elements are preferably single carbide elements. The multiple runner snowmobile ski is of a type having multiple wear rods or of a type having multiple wear rods with wear resistant elements. The multiple wear resistant elements are preferably dual carbide elements.

The slide member has a length and a width and a thickness. The guide members include a plurality of raised vertical ribs, and respectively formed grooves extending longitudinally along the length of the slide member. The plurality of vertically raised ribs are disposed in pairs along the width of the slide member to permit the use of the slide with snowmobile skis of varying runner designs, types, and ski stances. Each pair of raised vertical ribs defines a pair of upwardly facing surfaces and a groove therebetween. Each vertical rib of the plurality of raised vertical ribs has a rib height. On ski runners only having wear rods, the wear rods each have a wear rod height (runner height), which exceeds the rib vertical height of the vertical rib. On ski runners having a wear rod and a wear resistant element, the combined height (runner height) of the wear rod and wear resistant element exceeds the rib height of the vertical rib. The grooves are suitably spaced along the width of the slide member to engage, support and guide the wear rods or the wear rods and the wear resistant elements of the snowmobile within the grooves.

The slide member is made of a material that withstands shock and breakage in cold weather and does not chip, crack or peel, and is preferably extruded of a high-density polyethylene plastic. Pairs of the slide members are fastened, using fasteners onto the deck (and ramp(s), if any) of a snowmobile trailer in a parallel fashion.

The present invention also discloses snowmobile slide kit having the slide members of the present invention and preferably fasteners. For a typical tilt bed trailer which accommodate two snowmobiles, the slides are fastened to the trailer bed (also, hereinthroughout, deck) in a parallel fashion, using the fasteners. For a typical drive-on/drive-off trailer, which accommodates four snowmobiles, the slides are fastened to the trailer deck in four parallel rows with the fasteners. Similarly, the slides are fastened to the ramp of the trailer in parallel rows using the fasteners. A slide extension kit is used in combination with the slides.

The apparatus of the present invention is of a construction which is both durable and long lasting, and which will require little or no maintenance to be provided by the user throughout its operating lifetime. The apparatus of the present invention is also of inexpensive construction to enhance its market appeal and to thereby afford it the broadest possible market. Finally, all of the aforesaid advantages and objectives are achieved without incurring any substantial relative disadvantage.

Other advantages and a fuller appreciation of the specific attributes of this invention will be gained upon an examination of the following drawings, detailed description of the preferred embodiment, and appended claims. It is expressly understood that the drawings are for the purpose of illustration and description only and are not intended as a definition of the limits of the invention.

DESCRIPTION OF THE DRAWINGS

These and other advantages of the present invention are best understood with reference to the drawings, in which:

FIG. 1 is a perspective view of the snowmobile slide of the present invention;

FIG. 2 is an enlarged cross sectional view of the snowmobile slide of FIG. 1 taken through 2—2;

FIGS. 3 and 4 are sectional views illustrating engagement of a single runner snowmobile ski with the snowmobile slide of the present invention;

FIGS. 5 and 6 are sectional views illustrating engagement of a multiple runner snowmobile ski with the snowmobile slide of the present invention; and FIGS. 7 and 8 illustrate a slide kit of the present invention installed on snowmobile trailers.

DETAILED DESCRIPTION OF THE PREFERRED EMBODIMENT

Referring now to FIGS. 1–8, wherein like numbers refer to similar parts, a snowmobile slide in accordance with the present invention is designated generally as 20.

Referring now to FIGS. 1–6, the snowmobile slide 20 of the present invention has a slide member 22 having specific guide members 24, 25, 26, 27, 28 therein for guiding, supporting and contacting (engaging) a single runner snowmobile ski 30 of a snowmobile (not shown) and a multiple runner snowmobile ski 32 of a snowmobile (not shown). In FIGS. 3–6, snowmobile skis 30, 32 (not drawn to scale) are shown in partial cross section to illustrate engagement with slide 20 also shown in cross section. As best shown in FIGS. 3 and 4, the single runner snowmobile ski 30 is of a type having a runner which is a single wear rod 36 (FIG. 3) or of a type having a runner which is a single wear rod 36 with a wear resistant element 38 (FIG. 4). The wear rod 36 is engaged with a portion of ski body 40. The single wear resistant element (also, herein throughout, insert) 38 is preferably made of a metal carbide material; with the ski referred to as a "single carbide runner ski". Typically for the single runner snowmobile ski, the wear rod 36 as shown in FIG. 3 or the wear resistant insert 38 as shown in FIG. 4 is centered within a 14.0 cm (5 and ½ inch) ski. As best shown in FIGS. 5 and 6, the multiple runner snowmobile ski 32 is of a type having a runner having multiple wear rods 42 (FIG. 5) or of a type having a runner having multiple wear rods 42 with wear resistant elements (also inserts) 44 (FIG. 6). The wear rod 42 is engaged with a portion of ski body 45. The multiple wear resistant elements 44 are preferably made of a metal carbide material. Dual (or two) runner skis are commercially available and those having a wear resistant insert 44 are often referred to as "dual carbide skis." The dual carbide skis are believed to double the steering and control performances provided by each ski over the single carbide runner ski. The preferred embodiment, a single snowmobile slide 20 advantageously accommodates single runner and multiple runner snowmobile skis on the same slide, eliminating the need to have a separate slide or a separate trailer for the snowmobile having single runner skis and a separate snowmobile slide or a separate trailer for the snowmobile having multiple runner skis.

Referring again to FIGS. 1 and 2, the slide member 22 has a length "L", a width "W", a thickness "T", an upper surface 46 having portions thereof which engage the runner of the snowmobile's ski and a lower surface 47 which is generally flat and which surface is placed on a snowmobile trailer (and ramp, if present). The guide members 24, 25, 26, 27, 28 include a plurality of raised vertical ribs (or ridges) 48, 50, 52, 54, 56, 60 and respectively formed grooves (or recesses) extending longitudinally along the length "L" of slide member 22. The raised vertical ribs are disposed in pairs, 48–50, 50–52, 52–54, 54–56, and 56–60, along the width "W" of slide member 22 to permit the use of the slide with snowmobile skis of varying runner designs and types. Guide members 24, 25, 26, 27, 28 each include a pair of vertical ribs with a groove therebetween. Each pair of raised vertical ribs defines a pair of upwardly facing surfaces (top of vertical rib) and groove therebetween. Each vertical rib of the plurality of raised vertical ribs has a rib height. Preferably each vertical rib is curved having a radius of curvature. Guide members 25, 26, and 27 are specific for the single runner ski of a snowmobile. Guide members 24 and 28 are specific for the multiple runner ski of a snowmobile.

Guide member 24 is formed by vertical rib pair 48–50 and groove 66. Pair 48–50 has upwardly facing surfaces 62, 64 (at the highest points of the ribs) and groove 66 therebetween. Guide member 25 is formed by vertical rib pair 50–52 and groove 67. Pair 50–52 has upwardly facing surfaces 64 and 68 (at the highest point of the ribs) and groove 67 therebetween. Guide member 26 is formed by vertical rib pair 52–54 and groove 72. Pair 52–54 has upwardly facing surfaces 68, 70 (at the highest point of the ribs) and groove 72 therebetween. Guide member 27 is formed by vertical rib pair 54–56 and groove 77. Pair 54–56 has upwardly facing surfaces 70–74 (at the highest point of the ribs) and groove 77 therebetween. Guide member 28 is formed by vertical rib member pair 56–60. Pair 56–60 has upwardly facing surfaces 74, 76 (at the highest point of the ribs), and groove 78 therebetween. Preferably each groove 66, 67, 72, 77, 78 has a generally flat surface upon which the ski runner contacts and rests. Grooves 66 and 78 are suitably dimensioned to provide ample surface area for dual runner skis of different manufacturers and preferably groove 66 and 78 have a same flat surface width. Grooves 67, 72, and 77 are suitably dimensioned to provide ample surface for single runner skis of different manufacturers and have preferably a same flat surface width. The rib height is measured from the flat surface of the groove to the upwardly facing surface at the highest point of the rib. The flat surfaces of each of the grooves are preferably in the same plane if the ribs were not present. Ribs 48 and 60 (which are the outermost ribs) each have preferably the same rib height 80. Ribs 50, 52, 54, and 56 (which are the innermost ribs) each have preferably the same rib height 82. Ribs 48 and 60 are slightly higher than innermost ribs 50, 52, 54, 56. In normal use, the outermost ribs 48 and 60 help contain the skis 30, 32 within the slide 20 and prevent the snowmobile from being non-intentionally guided off the slide 20 laterally. The innermost ribs 50, 52, 54, 56 are slightly lower than ribs 48, 60 but still allowing the snowmobile to be contained, are at height sufficient to allow the skis 30, 32 to be forced up and over the ribs at the desire of the snowmobile operator. Ribs 48 and 60 are at a height low enough for the snowmobile operator to intentionally guide the snowmobile off the slide 20 for crossover purposes. The selected height of the ribs and the radius profile (radius of curvature) of the ribs permits the snowmobile operator to easily crossover from one side of the snowmobile trailer to the other.

Preferably the lower surface 47 has recesses 86, 88, 90, 92, 94, 96 under ribs 48, 50, 52, 54, 56, and 60, respectively. Recesses 86, 88, 90, 94, 96 advantageously provide for air circulation and for fluid drainage when the slide 20 is affixed to a snowmobile trailer. Alternatively, the lower surface 47 could have recesses in other locations or the lower surface could have no recesses and be flat.

As shown in FIGS. 3 and 5, on ski runners only having wear rods, the runner height is a wear rod height 95. The wear rod height exceeds the rib height 80, 82 of the vertical ribs. As shown in FIGS. 4 and 6, on skis having a wear rod and a wear resistant element, the runner height is a combined height 97 (of the wear rod and the wear resistant element) which exceeds the rib height 80, 82 of the vertical ribs. Grooves 66, 67, 72, 77, and 78 are dimensioned and spaced to engage, support and guide the wear rods as shown in FIGS. 3 and 5, or the wear rods and the wear resistant elements as shown in FIGS. 4 and 6 of the snowmobile within the appropriate grooves.

The slide member 22 has two outer flat portions 98, 100 for mounting purposes. Flat portions 98, 100 preferably are parallel to guide members 24, 25, 26, 27, 28. Both flat portion 98, 100 have access slots 102, therein for accepting fasteners 104, preferably standard wood screws or other stainless steel hardware (see FIGS. 7 and 8). Flat portion 98 is wider than flat portion 100. Flat portion 98 is positioned towards the outside of a trailer where there may be a sidewall. The wider flat portion 98 provides additional clearance for a drill or screwdriver to affix the fastener 104 through access slot 102 to the deck of a snowmobile trailer. Preferably groove 72 is centered between rib heights at the highest point of the rib, for ribs 52 and 54. The access slots 102 are configured to facilitate accepting the fastener 104 and to allow the snowmobile slide 20 to expand and contract with temperature changes as is normal with the material used in snowmobile slide 20.

The snowmobile slide 20 is made of a material that withstands shock and breakage in cold weather and does not chip, crack or peel, preferably of a high-density polyethylene (HDPE) plastic. The HDPE is sufficiently durable that the life expectancy of a pair of the slides 20 is ten years or longer depending on the care provided by the owner. However, other materials may be used. Preferably, snowmobile slide 20 is extruded from the HDPE in suitable lengths for application to a snowmobile trailer deck (and ramp, if present and desired). Extrusion is preferred also to provide curved ribs (ribs having a radius of curvature) having smooth profiles for the up and over motion during intentional guiding of the snowmobile over the slide 20 for cross-over purposes. However, the snowmobile slide 20 may be molded or shaped in other ways known in the art. Snowmobile trailer lengths may vary, typically from 3.0 meters to 9.8 meters (10 feet to 32 feet). Since the lengths of standard commercially available snowmobile trailers are about 3.0 meters (10 feet) or about 6.1 meters (20 feet), the snowmobile slide 20 may be manufactured most preferably in less than the full length of the snowmobile trailer for ease of transporting, assembling and shipping the snowmobile slide 20. The slides 20 are combined appropriately in "ski paths" and fastened to the snowmobile trailer (and ramp, if any). Alternatively, the snowmobile slide 20 of the present invention may be extruded in any custom length to fit a snowmobile trailer length.

As best shown in FIG. 7, the slides 20 are arranged on a 3.0 meter (10 foot) long snowmobile trailer deck in four ski paths which are parallel to each other to accommodate two snowmobiles, one next to the other. If four snowmobiles are to be transported on a 6.1 meter (20 foot) long trailer, as best shown in FIG. 8, the slides are arranged to form four parallel ski paths, to accommodate the four snowmobiles. Pairs of the snowmobile slides 20 are fastened using fasteners 104, onto the deck (and ramp(s), if any) of a snowmobile trailer. As can be appreciated, if a nonstandard trailer is used, and the trailer is to accommodate two snowmobile, one behind the other, or if only two ski paths are desired on the standard 6.1 meter (20 foot) trailer, a minimum of two slides 20 is required to have two parallel ski paths where the slides 20 are suitably dimensioned to have a length corresponding to the length of the snowmobile trailer. Alternatively, more slides 20 having a length dimension less than the length of the snowmobile trailer may be combined end to end to extend to the length of the snowmobile trailer to form a single ski path.

As is known in the art, other single runner snowmobile skis may have different configurations with respect to the ski body 40, than that illustrated in FIGS. 3 and 4, for example see U.S. Pat. Nos. 5,546,870, 5,609,110 and Ultimate Sports, Inc. ski kits, at http://www.usi-skis.com each of which disclosures are incorporated herein by reference. The snowmobile slide 20 of the present invention is suitably dimensioned to accommodate the single runner skis illustrated in FIGS. 3 and 4 and other single runner skis including those described supra, in a manner such that the ski's wear rod 36 in FIG. 3 or the ski's wear resistant insert 38 as in FIG. 4 or other similar runner configurations have only one point of friction per ski with the snowmobile slide 20. The point of friction is groove 72 or groove 67 or groove 77 depending upon ski stance. Preferably the ski stance is such that the point of friction is groove 72. Most advantageously, the ski body 40 does not slide over two points of friction. Unlike the prior art, Meacham supra, in the present invention, the two surfaces 68, 70, (or 64, 68, or 70, 74) are not in contact with the ski body 40, thereby reducing the friction while sliding the snowmobile onto or off a snowmobile trailer, by a factor of two. Another advantage is that the weight of the snowmobile is not being supported by the ski body 40, but rather by the ski's wear rod 36 in FIG. 3, or the ski's wear resistant insert 38 as in FIG. 4, thereby preventing possible damage to the ski body 40 and need for more frequent replacement.

Similarly for the dual runner skis shown in FIGS. 5 and 6, as is known in the art, other dual runner snowmobile skis may have different configurations with respect to the ski body 45, than that illustrated in FIGS. 5 and 6. The snowmobile slide 20 of the present invention is suitably dimensioned to accommodate the dual runner skis illustrated in FIGS. 5 and 6 and other dual runner skis, in a manner such that, each of the ski's wear rods 42 in FIG. 5 or the ski's wear resistant inserts 44 as in FIG. 6, or other multiple runner configurations have only one point of friction per wear rod 42 as in FIG. 5 or per wear resistant insert 44 as shown in FIG. 6. The single point of friction is the groove which the runner contacts. So, in FIGS. 5 and 6, the points of contact for the dual runner ski are groove 66 and groove 78. Most advantageously, in normal use, the ski body 45 has one point of friction per wear rod 42 in FIG. 5 or per wear resistant insert 44 as in FIG. 6. Unlike the prior art, Meacham supra, in the present invention the upwardly facing surfaces 62, 64, and upwardly facing surfaces 74, 76 are not in contact with ski body 45, thereby reducing the friction while sliding the snowmobile onto or off a snowmobile trailer, by a factor of two. Again, another advantage is that the weight of the snowmobile is not being supported by the ski body 45, but rather by the ski's wear rod 42 as in FIG. 5 or the ski's wear resistant insert 44 as in FIG. 6, thereby preventing possible damage to the ski body 45 and need for more frequent replacement.

In a preferred embodiment snowmobile slide 20 of the present invention was extruded of HDPE in slide member length "L" of about 1.5 meters (five feet). The slide member width "W" was about 23.5 cm (9.25 inches). The slide thickness "T" was about 0.6 cm (¼ inch). Outermost ribs 48, 60 had rib heights 80 of about 0.6 cm (¼ inch) each. Ribs 50, 52, 54, 56 had rib heights 82 of about 0.3 cm (⅛ inch) each. Flat portion 98 was about 3.5 cm (1 and ⅜ inches) wide with a center of the access slot about 2.5 cm (1 inch) from the edge. Flat portion 100 was about 1.3 cm (½ inch) wide. Grooves 66, 78 each had a flat surface width of about 3.5 cm (1 and ⅜ inches). Groove 67, 72, and 77 each had a flat surface width of about 1.3 cm (½ inch). Recesses 86, 88, 90, 92, 94, 96 were under ribs 48, 50, 52, 54, 56, and 60 respectively. For about a 3.0 meter (10 foot) snowmobile trailer carrying two snowmobiles with one next to the other, eight slides were required. For a 6.1 meter (20 foot) snowmobile trailer carrying four snowmobiles in a two by two fashion, sixteen slides were required. For snowmobile trailers of non-standard lengths where additional slide 20 is needed for deck length coverage, a slide extension kit was used. For example, for a 3.7 meter (12 foot) long trailer carrying two snowmobiles side by side, four slides of the preferred embodiment, but with 0.6 meter (2 feet) length were required in addition to the eight slides of 1.5 meters (5 feet). Typically, at least two of the 1.5 meter (5 foot) slides of the preferred embodiment were used on the snowmobile ramp. (Note slight differences in the lengths in metric units occur because of round off conventions when converting foot/feet and inches to metric lengths in units of centimeters and meters.)

As best shown in FIGS. 7 and 8, another embodiment of the present invention is a snowmobile slide kit 200 having the snowmobile slide 20 of the present invention and preferably fasteners 104. In FIGS. 7 and 8, snowmobile trailers 202, 203, 204 and snowmobile ramp 210 are shown in phantom line. The snowmobile slide kit 200 includes a plurality of snowmobile slides 20. The snowmobile slides 20 are spaced in parallel ski paths with pairs of ski paths spaced apart from one another to accommodate commercially used ski stances. Slides 20 are preferably oriented to have flat surface 98 parallel with any sidewalls 205 of the snowmobile trailer and preferably disposed such that flat surfaces 98 are adjacent to the sidewalls. Slide 20 is in a length sufficient to extend a length (LT) of the deck 202 of a snowmobile trailer 204. Alternatively, slide 20 may be prepared in sections less than the full snowmobile deck trailer length (LT). The combined length of each of the sections is suitably dimensioned to extend the length (LT) of the trailer deck.

FIG. 7 shows slides 20 in slide kit 200 applied to a snowmobile trailer having a 3.0 meter (10 foot) deck length which is shown as LT-10 (LT of a 10 foot long trailer). This trailer is identified as trailer 202. FIG. 7 also illustrates how the slide kit 200 can be to applied along with the slide extension kit 212 to trailer deck length of 3.7 meters (12 feet) which is shown as LT-12 (LT of a 12 foot long trailer).

This trailer is identified as trailer 203. In a preferred embodiment as best shown in FIG. 7, the snowmobile slide kit 200 for use on a deck 206 of a standard 3.0 meter (10 foot) long (LT-10) tilt-bed snowmobile trailer 202 for carrying two snowmobiles (not shown), side by side, included preferably eight snowmobile slides 20 (each 1.5 meters (5 foot) long) as described in the preferred embodiment of snowmobile slide 20 supra. The slides 20 were attached in four parallel rows: each row was a path for a single ski (herein referred to as "single ski path"). Two of the slides 20 were aligned to form a single ski path. Another two slides 20 were aligned to form a second single ski path parallel to the first track and spaced for appropriate ski stances (groove 72 on one slide to groove 72 on the other slide, or alternatively groove 67 on one slide to groove 67 on the other slide, or alternatively groove 77 on one slide to groove 77 on the other slide). Two of the slides 20 were aligned to form a third single ski path. Another two slides 20 were aligned to form a fourth single ski path parallel to the third single ski path and spaced for appropriate ski stances (groove 72 on one to groove 72 on the other, or alternatively groove 67 on one slide to groove 67 on the other slide or alternatively groove 77 on one slide to groove 77 on the other slide). All four ski paths were parallel to each other and to a length LT-10 of the snowmobile trailer 202. The slides 20 were oriented such that fasteners 104, preferably stainless steel hardware, preferably provided, were used to attach the slides 20 to the deck 206 of the trailer 202. A pair of single ski paths (first and second) accommodates one snowmobile and the second pair of single ski paths (third and fourth) accommodates the second snowmobile in a side by side snowmobile orientation. As also shown in FIG. 7, for trailer 203, if the trailer's deck length is 3.7 meters (12 feet) (LT-12), the aforementioned slides 20 can be applied as above to cover 3.0 meters (10 feet) of the 3.7 meters (12 foot) length and additional slides 20 in a slide extension kit 212 are used to cover the remaining approximately 0.6 meters (two feet) of trailer deck length (extension length, LE) for each ski path. Here, four additional slides 20 are fastened to the trailer deck preferably using fasteners 104. The slides 20 are suitably dimensioned to the LE.

As shown in FIG. 8, for a typical drive-on/drive-off trailer 204, which is typically about 6.1 meters (20 feet) long and which accommodates four snowmobiles (not shown), the snowmobile slides 20 are fastened in four parallel rows to trailer deck 208 with the fasteners 104. The snowmobile slide kit 200 for use with a snowmobile trailer which accommodates four snowmobiles requires at least four snowmobile slides 20. In a preferred embodiment as shown in FIG. 8, the snowmobile slide kit 200 for use on a 6.1 meter (20 foot) long snowmobile trailer 204 for carrying four snowmobiles, two side by side and one in front of one another, preferably included sixteen snowmobile slides 20 (each 1.5 meters (5 feet) long) as described in the preferred embodiment of snowmobile slide 20, supra. Four of the slides were aligned to form a first single ski path. Another four slides were aligned to form a second single ski path parallel to the first single ski path and spaced for appropriate ski stances (groove 72 on one slide to groove 72 on the other slide, or alternatively, groove 67 on one slide to groove 67 on the other slide or groove 77 on one slide to groove 77 on the other slide). Four of the slides were aligned to form a third single ski path. Another four slides were aligned to form a fourth single ski path parallel to the third single ski path and spaced for appropriate ski stances (groove 72 on one to groove 72 on the other, or alternatively groove 67 on one slide to groove 67 on the other slide, or groove 77 on one slide to groove 77 on the other slide). All four single ski paths were parallel to each other and to a length (LT) of the trailer. Fasteners 104, preferably stainless steel hardware, were provided and used to fasten the slides 20 to the trailer deck 208. The four single ski paths accommodate four snowmobiles in a two by two fashion. A pair of single ski paths (first and second) accommodates two snowmobiles, one in front of the other, and the second pair of single ski paths (third and fourth) accommodate another two snowmobiles, one in front of the other.

The snowmobile slide kit also includes a slide extension kit 212 for use when the length of a single slide 20 or multiple slides 20 when combined end to end do not extend the full length (LT) of the snowmobile trailer. The slide extension kit includes slides 20 which have lengths suitably dimensioned such that when one or more is added to the length of the slide single 20 or multiple combined slides 20, (supra) the added slides 20 will extend a single ski path to the length of the trailer. In a preferred embodiment as shown in FIG. 7, the snowmobile slide kit 200 included snowmobile slide extension kit 212. The slide extension kit 212 was sized to provide a 0.6 meter (2 foot) extension to be used in combination with the slides 20 that were preferably 1.5 meters (5 feet) in length. Thus, for a 3.7 meter (12 foot) long trailer length (LT-12), a 0.6 meter (2 foot) extension length (LE) of the slide 20 was used in addition to the slides 20 extending 3 meters (10 feet). The preferred embodiment of the slide extension kit 212 included preferably four snowmobile slides 20 as described in the preferred embodiment of snowmobile slide 20, supra, except that each slide 20 was 0.6 meters (2 feet) long, not 1.5 meters (5 feet) long. Slides 20 of slide extension kit 212 were oriented as described supra for trailer 202 and fastened to deck 205 (3.7 meter long deck) with fasteners 104.

Similarly, as shown in FIG. 8, the slide extension kit 212 includes at least one pair of slides 20, which alone or in combination, are dimensioned to fit a snowmobile trailer ramp length (LR) and affixed to a detachable snowmobile ramp 210 in similar ways as discussed supra, using fasteners 104, preferably included in slide extension kit 212. Usually only two parallel single ski paths are on a ramp 210, but additional pairs of parallel ski paths may be added to wider ramps if desired. The snowmobile trailer ramp 210 with slides 20 affixed thereto may be used with any type of snowmobile trailer.

For a nonstandard length snowmobile trailer or for a standard 6.1 meter (20 foot) long trailer to accommodate only two snowmobiles one behind the other, two snowmobile slides 20 suitably dimensioned to extend the length of the snowmobile trailer are fastened to a trailer deck in a parallel fashion for an appropriate ski stance as discussed above, using fasteners 104. Alternatively, a plurality of slides 20 of the preferred embodiment supra, and/or the slide extension kit 212 may be arranged end to end to form a first single ski path and a second single ski path. The first and second ski paths are parallel to each other and to the length of the snowmobile trailer and spaced for appropriate snowmobile ski stances (groove 72 on one to groove 72 on the other, or alternatively, groove 67 on one to groove 67 on the other, or groove 77 on one to groove 77 on the other). This can easily be visualized in FIG. 8, where instead of four parallel ski paths only two of the parallel ski paths are present, e.g. the first single ski path and second single ski path, or third single ski path and the fourth single ski path.

As is apparent to those skilled in the art, pairs of slides 20 can be affixed to the snowmobile trailer and/or snowmobile trailer ramp in many different configurations. This invention comprehends that the lengths L of slides 20 may vary as needed. It should be understood that the snowmobile ski market is constantly evolving, with new products appearing with regularity, therefore the heights of ribs 48 and 60 and/or the rib heights of 50, 52, 54, and 56 may be adjusted from that of the preferred embodiment. Likewise, the overall width "W" of the snowmobile slide 20 may be increased or decreased as trailer needs change in the future. Also, grooves 66 and 78 and/or grooves 67, 72, 77 may be made wider or narrower from that of the preferred embodiment as the snowmobile ski market conforms to more universal spacing on the ski runners. Also, radius of curvature of the ribs may change depending on changes in rib height and groove width. Furthermore, as other multiple runner configurations are developed, the present invention may be suitably modified or not modified to accommodate the new runner configurations. For example, if a triple runner ski were designed with a third runner centered between the two outermost runners, grooves 66, 72, and 78 could receive and contact the three runners (wear rods or wear resistant inserts) with ribs 48, 50, 52, 54, 56, 60 spaced from any ski body, without modification to the present invention.

Although an exemplary embodiment of the present invention has been shown and described with reference to particular embodiments and applications thereof, it will be apparent to those having ordinary skill in the art that a number of changes, modifications, or alterations to the invention as described herein may be made, none of which depart from the spirit or scope of the present invention. All such changes, modifications, and alterations should therefore be seen as being within the scope of the present invention and that the scope of the present invention be limited solely by the broadest interpretation that lawfully can be accorded the appended claims.

What is claimed is:

1. A snowmobile slide comprising: a slide member having specific guide members having flat surface grooves therein for guiding, supporting, and contacting both a single runner snowmobile ski and a multiple runner snowmobile ski, wherein the specific guide members include an outer pair of the specific guide members disposed on opposite sides of a width of the slide member and at least one inner guide member disposed therebetween, and wherein a width of the flat surface grooves of each of the outer pair of the specific guide members is wider than a width of the flat surface grooves of the at least one inner guide member.

2. The snowmobile slide of claim 1 comprising a plurality of inner guide members disposed between the outer pair of the specific guide members and wherein a width of the flat surface grooves of each of the outer pair of the specific guide members is wider than a width of the flat surface grooves of each of the plurality of inner guide members.

3. A snowmobile slide set for mounting on a snowmobile trailer, the snowmobile slide set for accommodating single runner snowmobile skis and multiple runner snowmobile skis, the snowmobile slide set comprising: a pair of slide members, each slide member having specific guide members having flat surface grooves therein for guiding, supporting, and contacting a single runner snowmobile ski and on the same slide member having other specific guide members having flat surface grooves therein for guiding, supporting, and contacting a multiple runner snowmobile ski, each guide member having a single flat surface available for supporting a runner of a snowmobile ski, wherein the specific guide members of each slide member include an outer pair of the specific guide members disposed on opposite sides of a width of the slide member and at least one inner guide member disposed therebetween, and wherein a width of the grooves of each of the outer pair of the specific guide members is wider than a width of the grooves of the at least one inner guide member.

4. The snowmobile slide set as defined in claim 3, wherein each of the slide members has a length, a width and a thickness; and wherein the guide members include a plurality of raised vertical ribs extending longitudinally along the length of the slide member and wherein the plurality of raised vertical ribs are disposed in pairs along the width of the slide member to permit the use of the slide member with snowmobile skis of varying runner designs and types.

5. The snowmobile slide set of claim 4, wherein each pair of raised vertical ribs defines a pair of upwardly facing surfaces and a flat surface groove therebetween, and wherein the pair of upwardly facing surfaces is spaced from the snowmobile ski and wherein one or more of the flat surface grooves on a slide member is contacted by the snowmobile ski.

6. The snowmobile slide set of claim 5, wherein the single runner snowmobile ski is of a type having a single wear rod or of a type having a single wear rod with a wear resistant element and wherein the multiple runner snowmobile ski is of a type having multiple wear rods or of a type having multiple wear rods with wear resistant elements, wherein each vertical rib of the plurality of raised vertical ribs has a rib height and wherein the wear rods each have a wear rod height which exceeds the rib height of the vertical rib and wherein each of the wear rods with the wear resistant elements have a height which exceeds the rib height of the vertical rib.

7. The snowmobile slide set of claim 3, wherein each of the snowmobile slides is fastened onto a deck and/or a ramp of the snowmobile trailer.

8. The snowmobile slide set of claim 3, wherein each of the slide members is made of a high-density polyethylene plastic.

9. The snowmobile slide set of claim 3, wherein each of the slide members is made of a material that withstands shock and breakage in cold weather and does not chip, crack or peel.

10. The snowmobile slide set of claim 3, wherein the single surface of a specific guide member is a specific flat surface groove and the flat surface grooves are spaced on the slide member to accept the multiple runner snowmobile ski.

11. The snowmobile slide set of claim 3, wherein the multiple runner snowmobile ski is a dual runner ski and wherein the guide members are spaced from each other on the slide member to accept the multiple runners of the multiple runner snowmobile ski.

12. The snowmobile slide set of claim 3, wherein each of the slide members has a length, a width, and a thickness, the guide members include a plurality of raised vertical ribs extending longitudinally along the length of the slide member and disposed in pairs along the width of the slide member to permit use of the slide with a snowmobile ski having a single or multiple runners, the single and multiple runner snowmobile skis being the type having only a wear rod or having a wear rod with a wear resistant member;

wherein each pair of raised vertical ribs defines a pair of upwardly facing surfaces and a flat surface groove therebetween; wherein each vertical rib of the plurality of raised vertical ribs has a rib height; wherein each runner has a runner height which exceeds the rib height of the vertical rib; and wherein the flat surface grooves are spaced to accommodate the runner of the single runner snowmobile ski and the runner of the multiple runner snowmobile ski without the ski resting on the upwardly facing surfaces of the raised vertical ribs.

13. The snowmobile slide set of claim 12, wherein each of the snowmobile slides is fastened onto a deck and/or ramp of a snowmobile trailer.

14. The snowmobile slide set of claim 12, wherein each of the slide members is made of a high-density polyethylene plastic.

15. The snowmobile slide set of claim 3 comprising a plurality of inner guide members disposed between the outer pair of the specific guide members and wherein a width of the flat surface grooves of each of the outer pair of the specific guide members is wider than a width of the flat surface grooves of each of the plurality of inner guide members.

16. A snowmobile slide kit for mounting on a snowmobile trailer comprising:
at least two snowmobile slides, each snowmobile slide including a slide member having specific guide members having flat surface grooves therein for guiding, supporting, and contacting both a single runner snowmobile ski and a multiple runner snowmobile ski on the same slide member, the flat surface grooves each having a single flat surface for supporting a runner of the snowmobile ski, wherein the specific guide members of each snowmobile slide include an outer pair of the specific guide members disposed on opposite sides of a width of the slide member and at least one inner guide member disposed therebetween, and wherein a width of the flat surface grooves of each of the outer pair of the specific guide members is wider than a width of the flat surface grooves of the at least one inner guide member.

17. The snowmobile kit of claim 16, wherein the snowmobile slide kit includes additional snowmobile slides dimensioned for use as a slide extension kit to be used on a snowmobile trailer deck and/or for use on a snowmobile trailer ramp.

18. The snowmobile kit of claim 16, further comprising fasteners for fastening the snowmobile slides to the snowmobile trailer.

19. The snowmobile slide kit of claim 16 comprising a plurality of inner guide members disposed between the outer pair of the specific guide members and wherein a width of the flat surface grooves of each of the outer pair of the specific guide members is wider than a width of the flat surface grooves of each of the plurality of inner guide members.

20. A snowmobile slide for guiding, supporting and engaging one or more runners of one of the skis of the two skis of a snowmobile, the slide comprising a plurality of guide members wherein a pair of specific guide members of the plurality of guide members is disposed on opposite sides of a width of the slide member, with the remainder of the plurality of guide members disposed therebetween, the pair of specific guide members suitably dimensioned and spaced for contacting outermost runners of a multiple runner snowmobile ski, each specific guide member of the pair of specific guide members each having a single flat runner supporting surface and the remainder of the plurality of guide members suitably dimensioned for supporting a runner of a single runner snowmobile ski or any non-outermost runner of the multiple runner snowmobile ski, and wherein a width of each specific guide member of the pair of specific guide members is wider than a width of each of the remainder of the plurality of guide members disposed therebetween.

* * * * *